May 24, 1960   F. X. DEMERS, JR., ET AL   2,938,054
PROCESS FOR PURIFICATION OF 4,4'-METHYLENEDIANILINE
Filed Feb. 18, 1958
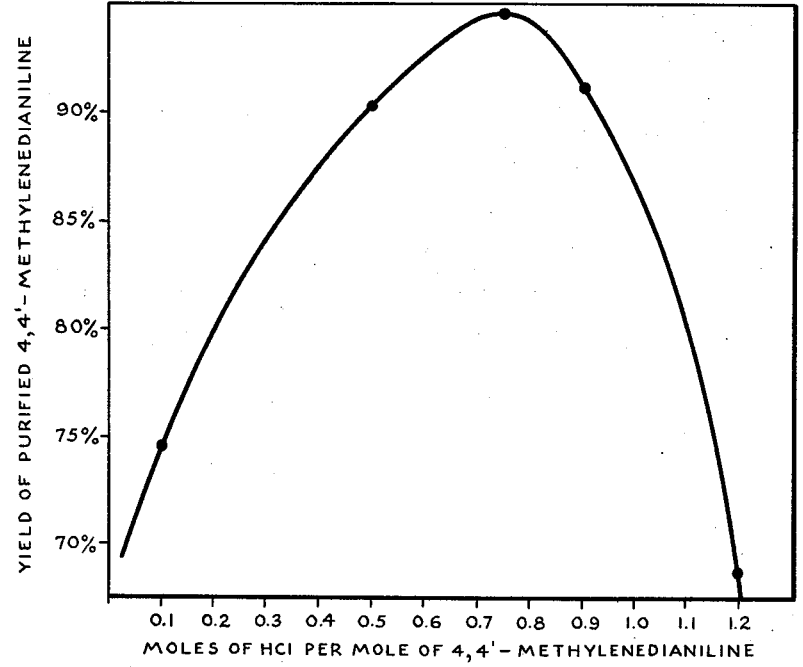
FIG. I.
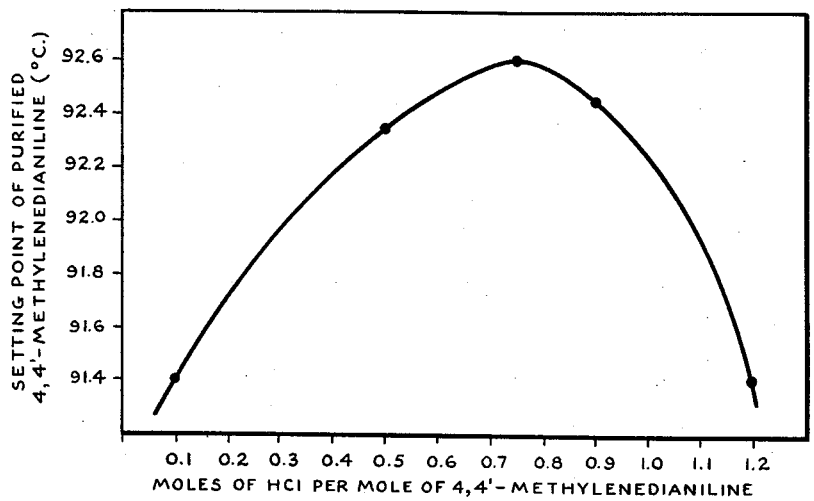
FIG. II.
INVENTORS
FRANCOIS M. DEMERS, JR.
THEODORE R. FINK
BY
ATTORNEY

United States Patent Office 2,938,054
Patented May 24, 1960

2,938,054

PROCESS FOR PURIFICATION OF 4,4'-METHYLENEDIANILINE

Francois X. Demers, Jr., Amherst, and Theodore R. Fink, Buffalo, N.Y., assignors to Allied Chemical Corporation, a corporation of New York Filed Feb. 18, 1958, Ser. No. 715,928

2 Claims. (Cl. 260—570)

This invention relates to the production of 4,4'-methylenedianiline and more particularly refers to a new and improved process for the purification of 4,4'-methylenedianiline.

4,4-methylenedianiline is an important chemical, which on phosgenation gives a 4,4'-methylenediphenyldiisocyanate, which latter pertains to the important field of diisocyanates particularly in the production of polyurethanes. 4,4'-methylenedianiline is obtained by condensation of formaldehyde and aniline in the presence of an acid catalyst. Unfortunately, the crude 4,4'-methylenedianiline thus obtained contains impurities which are difficult and economically impractical to remove. These impurities carry over to the 4,4'-methylenediphenyldiisocyanate produced by phosgenation, resulting in the diisocyanate contaminated with oily impurities and not a free-flowing powder.

An object of the present invention is to provide an efficient economical method for purification of crude 4,4'-methylenedianiline. Another object is to provide a process for purifying 4,4'-methylenedianiline to produce a product of improved quality and high yield. A further object is to provide a practicable method for commercial manufacture of comparatively pure 4,4'-methylenedianilinediisocyanate substantially free from oily impurities. Other objects and advantages will be apparent from the following description.

In accordance with the present invention crude 4,4'-methylenedianiline produced by a process involving the reaction of aniline and formaldehyde may be purified to produce a purified 4,4'-methylenedianiline in high yields by admixing crude 4,4'-methylenedianiline in aqueous medium with hydrochloric acid in the ratio of more than 0.4 mol but less than 1 mol, and preferably between about 0.5 to about 0.9 mol hydrochloric acid per mol of diamine, crystallizing a purified 4,4'-methylenedianiline hydrochloride product containing less than 1 mol of hydrogen chloride per mol of 4,4'-methylenedianiline, and separating the crystalline product thus obtained from the mother liquors containing dissolved impurities. The purified, non-stoichiometric 4,4'-methylenedianiline hydrochloride product may be basified to produce the purified 4,4'-methylenedianiline as the free base or it may be used as such.

Crude 4,4'-methylenedianiline may be prepared in a standard manner by heating a mixture of formaldehyde or substance yielding formaldehyde, preferably an aqueous solution of formaldehyde, with a molar excess of aniline roughly in a proportion of about 3 mols aniline for each mol formaldehyde in the presence of an acid catalyst, for example hydrochloric acid, to a temperature of about 70–100° C., preferably about 80–95° C., for a sufficient length of time, generally 2 to 5 hours, to cause condensation of the formaldehyde and the aniline. An excess of aqueous caustic soda solution is added to the reaction mixture and thereafter upon standing the reaction mixture separates into a lower aqueous layer and an upper layer containing the product. The upper product layer may be subjected to distillation at low subatmospheric pressure of about 5–10 mm. mercury pressure to produce crude 4,4'-methylenedianiline. The crude product has a setting point of about 90° C. Crude 4,4'-methylenedianiline may be made by reacting together anhydroformaldeaniline and aniline or by heating dianilinomethane. Anhydroformaldeaniline and dianilinomethane occur as intermediates in the reaction of formaldehyde with aniline.

The present invention is based on the discovery that the formation of non-stoichiometric 4,4'-methylenedianiline hydrochlorides effects more efficient separation in higher yield and provides a 4,4'-methylenedianiline product of greater purity than obtainable by distillation of the base or by crystallization of the diamine hydrochloride using at least 1 mol of hydrochloric acid per mol of diamine. An important advantage of the invention is that it provides a purified 4,4'-methylenedianiline product, which on phosgenation in standard manner, produces a purer 4,4'-methylenediphenyldiisocyanate product, which contains less or none of the objectionable oil impurities characterizing prior art products.

Crude 4,4'-methylenedianiline may be purified in accordance with the present invention by admixing it with aqueous hydrochloric acid in the proportion of 0.4 mol to less than 1.0 mol, preferably about 0.75 hydrochloric acid, per mol of 4,4'-methylenedianiline and heating the mixture with agitation to a temperature of about 50–100° C., preferably 60–85° C. Thereafter the mixture is cooled to about room temperature or lower, preferably about 20–35° C., to effect crystallization of a purified 4,4'-methylenedianiline hydrochloride product containing less than 1 mol of hydrogen chloride per mol of 4,4'-methylenedianiline. The crystals may be separated by filtration and the filter cake may be washed with a salt solution and water to remove occluded mother liquor, treated with caustic soda solution to basify it, and then dried. The resultant product has a setting point above 92.0° C. and on phosgenation produces a 4,4'-methylenediphenyldiisocyanate product, which contains little or no oily impurities.

The following examples illustrate the present invention. The values given in the examples are parts by weight unless otherwise stated.

EXAMPLES 1–5

Aqueous formaldehyde (37% strength; 700 parts=8.64 mols) was added slowly over a period of one hour, to an agitated mixture at 25–30° C. of water (1948 parts), 20° Bé. hydrochloric acid (1965 parts=17.2 mols HCl), and aniline (2390 parts=25.7 mols). The resulting mass was heated to 90° C. in a period of 1 to 2 hours, then agitated at 90° C. for 3 hours and finally drowned in aqueous caustic soda solution (1740 parts=21.7 mols NaOH). The mass obtained was heated to 90–95° C., and then allowed to settle for one hour. The lower aqueous layer was discarded. The upper product layer was distilled in vacuo at 8–10 mm. mercury pressure. The first run of distillate up to 30° C. was water, and to 90° C. the distillate was a mixture of water and aniline. The main product, 4,4'-methylenedianiline, distilled from about 235° C. to about 250° C. at 8 mm. mercury pressure. It had a setting point of 90° C.

Five equal portions of 4,4'-methylenedianiline, obtained above, were purified in the following manner. Each portion amounting to 1250 parts (equal to 6.3 mols), was suspended in 5050 parts of water at 75° C. Then 20° Bé. hydrochloric acid in amount shown in Table I was slowly added with agitation.

Table I

| Example | Parts Hydrochloric Acid Solution 20° Bé | Mols HCl | Ratio of Mols HCl to Mols 4,4'-Methylenedianiline |
| --- | --- | --- | --- |
| 1 | 73 | 0.63 | 0.10 |
| 2 | 366 | 3.15 | 0.50 |
| 3 | 548 | 4.72 | 0.75 |
| 4 | 658 | 5.67 | 0.90 |
| 5 | 878 | 7.56 | 1.20 |

The mixtures agitated for half an hour, and the resulting slurries (an incomplete solution was obtained in Experiments 1 and 2) or solutions (a complete solution was obtained in Experiments 3, 4 and 5) were allowed to stand for 16 hours, cooled to 30° C. and filtered. Each filter cake was washed with 10% NaCl solution to displace mother liquor containing impurities, and then suspended in water (5050 parts). Sufficient 50% caustic soda solution was then added with agitation to make each batch strongly alkaline to Brilliant Yellow test paper. The agitated suspensions were heated to 80-85° C. filtered, washed free of caustic soda and dried in an air oven at 85° C.

Figures I and II of the drawing show the results of Examples 1 through 5. The setting point of the initial impure 4,4'-methylenedianiline was 90.0° C. The yield figures were based on the initial impure 4,4'-methylenedianiline used, namely 1250 parts or 6.30 mols.

As shown in the drawing in Figures I and II, 4,4'-methylenedianiline products, obtained by the use of hydrochloric acid in proportions greater than about 0.4 mol but less than 1 mol per mol of 4,4'-methylenedianiline, were superior in yield and purity (setting point).

EXAMPLE 6

Aqueous formaldehyde (37% strength; 700 parts=8.64 mols) was added slowly over a period of one hour to an agitated mixture at 25-30° C. of water (1948 parts), 20° Bé. hydrochloric acid (1965 parts=17.2 mols HCl), and aniline (2390 parts=25.7 mols). The resulting mass was heated to 90° C. in a period of 1 to 2 hours, then agitated at 90° C. for 3 hours and finally drowned in aqueous caustic soda solution (1740 parts=21.7 mols NaOH). The mass obtained was heated to 90-95° C. and then allowed to settle for one hour. The lower aqueous layer was discarded. The upper product layer was distilled in vacuo at 8-10 mm. mercury pressure. The first run of distillate up to 30° C. was water, and to 90° C. the distillate was a mixture of water and aniline. The main product, 4,4'-methylenedianiline, distilled from about 235° C. to about 250° C. at 8 mm. mercury pressure. It had a setting point of 90° C.

4,4'-methylenedianiline obtained as in Examples 1-5 (1250 parts=6.3 mols), was suspended in water (5050 parts), at 75° C. and 20° Bé. hydrochloric acid (548 parts=4.72 mols HCl), was slowly added with agitation (the ratio of the mols of HCl to the mols of 4,4'-methylenedianiline: 4.72/6.3=0.75). The mixture was agitated for half an hour and the resulting solution was allowed to stand for 16 hours (temp. is 30° C.) and filtered. The filter cake was washed with 10% common salt solution and dried in an air oven at 85° C.

The 4,4'-methylenedianiline hydrochloride product thus obtained, (1180 parts=1037 parts free base=5.23 mols=1.00 mol equivalents), was slurried in monochlorobenzene (6280 parts), at room temperature. The slurry was charged to a cold (0-5° C.) solution of phosgene (2720 parts=27.5 mols=5.26 mol equivalents), in monochlorobenzene (7310 parts), at such a rate that the temperature did not exceed 30° C. The reaction mixture was agitated for 15 minutes after which additional phosgene (2180 parts=22 mols=4.2 mol equivalents) was charged, while raising the temperature to reflux over a period of 6 hours (127-137° C.) and refluxing for 2 to 3 hours until the addition of phosgene was complete.

The batch was cooled to 110° C., purged for 2 hours with carbon dioxide to remove phosgene, and sludge filtered. The filtrate was solvent stripped until it reached 170° C. at 15 mm. mercury pressure. The solvent stripped bottoms were fractionally distilled in vacuo. The product, methylenediphenyl-4,4'-diisocyanate, was collected at 165-172° C. at 2 mm. mercury pressure.

The methylenediphenyl-4,4'-diisocyanate thus obtained possessed an excellent setting point (39.2° C.), and when crushed the product was a free flowing crystalline powder free from oily impurities.

When 4,4'-ethylenedianiline base of setting point 90° C. obtained above was used in place of the purified hydrochloride product there was obtained a methylenediphenyl-4,4'-diisocyanate product which possessed an inferior setting point, and when crushed was not a free-flowing powder and was contaminated with oily impurities.

Although certain preferred embodiments of the invention have been disclosed for purpose of illustration, it will be evident that various changes and modifications may be made therein without departing from the scope and spirit of the invention.

We claim:

1. A method of purifying crude 4,4'-methylenedianiline produced by a process involving the reaction of aniline and formaldehyde to produce a purified 4,4'-methylenedianiline which comprises admixing said crude 4,4'-methylenedianiline in aqueous medium with hydrochloric acid in the ratio of more than 0.4 mol but less than 1 mol hydrochloric acid per mol of 4,4'-methylenedianiline, crystallizing purified 4,4'-methylenedianiline hydrochloride product containing less than 1 mol of hydrogen chloride per mol of 4,4'-methylenedianiline, and separating the crystalline product thus obtained from the mother liquor containing dissolved impurities.

2. A method of purifying crude 4,4'-methylenedianiline produced by a process involving the reaction of aniline and formaldehyde to produce a purified 4,4'-methylenedianiline which comprises admixing said crude 4,4'-methylenedianiline in aqueous medium with hydrochloric acid in the ratio of between about 0.5 mol to about 0.9 mol hydrochloric acid per mol of 4,4'-methylenedianiline, crystallizing purified 4,4'-methylenedianiline hydrochloride product containing less than 1 mol of hydrogen chloride per mol of 4,4'-methylenedianiline, and separating the crystalline product thus obtained from the mother liquor containing dissolved impurities.

References Cited in the file of this patent

UNITED STATES PATENTS

| | | |
| --- | --- | --- |
| 2,577,076 | Ensor et al. | Dec. 4, 1951 |
| 2,644,007 | Irwin | June 30, 1953 |
| 2,818,433 | Erickson | Dec. 31, 1957 |

FOREIGN PATENTS

| | | |
| --- | --- | --- |
| 96,762 | Germany | Mar. 11, 1898 |
| 358,398 | Germany | Sept. 11, 1922 |
| 356,131 | Great Britain | Feb. 28, 1930 |